UNITED STATES PATENT OFFICE.

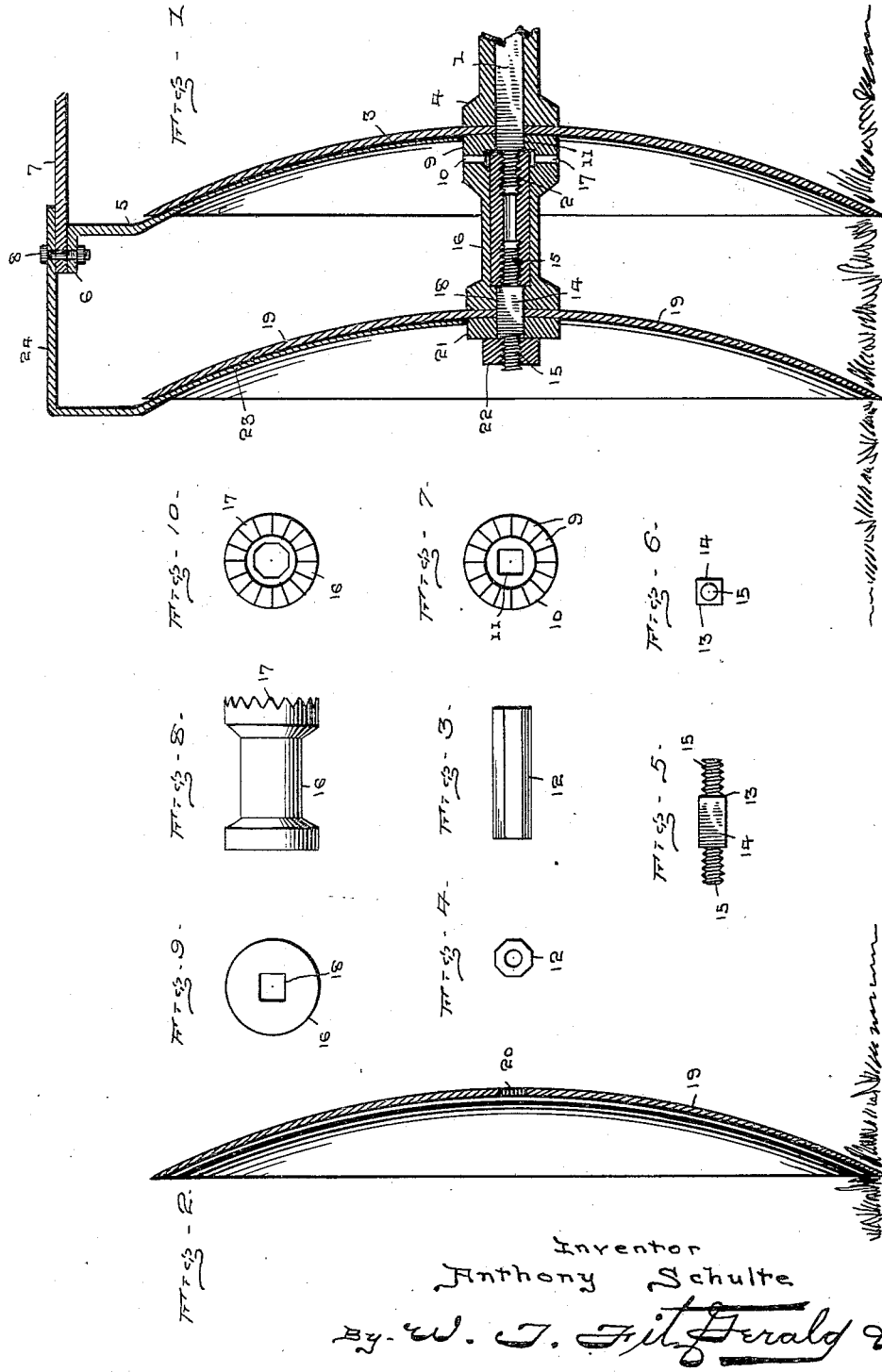

ANTHONY SCHULTE, OF HARTINGTON, NEBRASKA.

DISK-HARROW ATTACHMENT.

1,266,328.     Specification of Letters Patent.    Patented May 14, 1918.

Application filed June 1, 1917. Serial No. 172,250.

*To all whom it may concern:*

Be it known that I, ANTHONY SCHULTE, a citizen of the United States, residing at Hartington, in the county of Cedar and State of Nebraska, have invented certain new and useful Improvements in Disk-Harrow Attachments; and he does hereby declare the following to be a full, clear, and exact description of the invention, such as will enable others skilled in the art to which it appertains to make and use the same.

This invention relates to new and useful improvements in disk harrows and has for its primary object to provide additional disks which can be quickly and readily attached or detached from the disk gangs of any disk harrow of standard or well known construction, and by either attaching or detaching these additional disks, depending upon the degree of hardness of the soil, the resistance offered by the travel of the disks over the soil to the draft force can be regulated so that a predetermined draft force can be efficiently used under varying conditions and in connection with the soil irrespective of whether it is hard or comparatively soft.

A further object of the invention is to provide extension means adapted to be detachably connected to the outer ends of the disk gang axles, each of which carries one of the detachable disks.

A still further object of the invention is to provide a mud scraper bar adapted to be detachably connected to the scraper supporting bar of the harrow and supported in position against the concaved face of the disk.

With these and other objects in view as will appear as the description proceeds, the invention comprises the various novel features of construction, combination and arrangement of parts as will be more fully described hereinafter and set forth with particularity in the appended claims.

Referring to the drawings:—

Figure 1 is a vertical sectional view through the end disk of one of the disk gangs of a disk harrow of standard construction, and showing my improved detachable disk secured to the disk axle.

Fig. 2 is a vertical sectional view through the detachable disk.

Fig. 3 is a side elevation of the non circular extension sleeve.

Fig. 4 is an end view of the sleeve.

Fig. 5 is a side elevation of the extension stud.

Fig. 6 is an end view of the stud.

Fig. 7 is a front elevation of the lock washer.

Fig. 8 is a side elevation of the spool spacing member.

Fig. 9 is a view of one end of the spacing member, and

Fig. 10 is a view of the other end of the spacing member.

Similar characters of reference are used to denote corresponding parts throughout the accompanying drawings and the following description.

The standard disk harrows that are manufactured and placed upon the market at present are made in two sizes embodying large and small gangs of disks. The disk harrows embodying the small gangs are used with a draft force to harrow soil which possesses a great degree of hardness, while the harrows embodying these larger gangs of disks are used, with the same draft force, to harrow comparatively soft soil.

It is my aim to dispense with the placing of two different sizes of disk harrows upon the market and to provide additional disks which can be quickly and readily attached or detached from the gang of disks carried by the smaller size of disk harrow.

Referring more particularly to the drawings, it will be noted that the reference numeral 1 indicates the outer end of the square axle of one of the disk gangs, and is provided at its outer terminal end with a reduced threaded shank 2. This squared axle 1 has mounted on its adjacent end, the usual end disk 3, which is held in space relation to the adjacent disk of the gang by a spool spacing member 4. This end disk 3, is ordinarily held on the axle through the medium of a washer and nut, which is removed to allow of my improved construction of detachable disk to be connected to the axle.

The end disk 3 like each of the other disks of the gang is provided with a mud scraper 5 adapted to engage the inner concaved face of the disk and the upper end of the scraper is provided with an angular end 6 that is secured to the scraper supporting bar 7 through the medium of a bolt 8.

When it is desired to attach the additional disk, the nut and the washer used to hold the disk 3 in position, are removed and a lock washer 9 is positioned over the outer end of the axle 1 and normally rests against the end disk 3. The outer face of the lock washer 9 is provided with radially disposed teeth or serrations 10. This lock washer is provided centrally with a square opening 11 so as to receive the end of the square axle and prevent the lock washer from rotating or turning independently of the axle.

A polygonal or non circular extension sleeve 12 has one end threadedly mounted on the reduced shank 2 of the axle and is turned up thereon into engagement with the shoulder of the axle formed by the reduced threaded shank 2 so as to make a rigid connection between the sleeve and the axle. The reference numeral 13 represents a stud that is provided intermediate its ends with a square body portion 14 which carries a reduced threaded shank 15 at each end. One of the shanks 15 is threaded into the outer end of the non circular extension sleeve 12, and positioned over the body portion 14 of the stud and the non circular sleeve 12 is a spool spacing member 16.

One end of this spacing member is provided with radially disposed teeth or serrations 17 that are adapted to lockingly engage the radial teeth 10 of the lock washer 9. The opposite end of the spacing member 16 is provided centrally with a square opening 18 for the reception of the squared body portion 14 of the stud 13, while the opening extending through the spacing member from the squared opening to the end of the member containing the serrations is non circular in cross sectional contour so as to snugly receive the extension sleeve 12. By the construction of the non circular body portion 14 of the stud 13, the non circular extension sleeve 12 and non rotatable lock washer 9, it will be apparent that they will serve to hold the various relative parts against independent rotation with respect to each other and the harrow axle and its respective parts.

The extra or additional disk 19 is provided centrally with a square opening 20 for the reception of the square body portion 14 of the stud 13 and is adapted to rest against the outer end of the spacing member 16. The numeral 21 represents the washer which was removed from the end of the axle 1 prior to the attachment of the additional disk and as shown is positioned over the outer end of the square body portion 14 and against the disk 19. This washer 21 is held in place by a nut 22 mounted upon the outer threaded shank 15 of the stud 13, and this nut is the same nut that was originally mounted upon the reduced shank 2 to hold the washer 21 in position against the end disk 3.

After the extra disk 19 has been attached to the disk gang as shown, an extra mud scraper 23 having an upper angular end 24 is supported from the bar 7 in position against the concaved surface of the disk so as to effectively scrape the soil or mud from the disk during its rotation and in a manner similar to the action of the standard mud scrapers as indicated by the numeral 5. This angular end 24 of the scraper is detachably connected to the scraper supporting bar 7 through the medium of the same bolt 8 that is used to secure the scraper 5 in position.

From the foregoing description it will be apparent that when it is desired to harrow comparatively soft ground, the additional disk is attached in the position shown, and when it is desired to use the harrow with comparatively hard soil, with the same draft force, the additional disk 19 and its respective supporting parts are detached from the end of the axle 1. After the various relative parts, including the lock washer 9 have been removed from the axle, the washer 21 and the nut 22 are again arranged in position over the outer end of the axle 1 and on the threaded shank 2, respectively, into their original positions so as to securely hold and maintain the end disk 3 in position. While I have shown an additional disk attached to one end of one of the disk gangs, it is of course to be understood that an additional disk may be attached or added to the outer end of each gang of disks of the harrow. It is also to be understood that while I have shown a single disk attached to and added to the outer end of one disk gang, two or more disks may be added thereto by a slight change in construction and arrangement of parts.

I claim:

1. In a disk harrow, the combination with the axle and the outer disk carried thereby, of an extension member attached to said axle, a spacing sleeve positioned over said extension member, a disk mounted on the outer end of said extension member, and means for securing said last named disk rigidly on the extension member and against said sleeve.

2. In a disk harrow, the combination with the noncircular axle and the outer disk carried thereby, of a noncircular extension member detachably connected to said axle, a spacing sleeve positioned over said extension member, a disk mounted on the extension member against said sleeve, and means for rigidly securing said last named disk on said extension member.

3. In a disk harrow, the combination with the squared axle and its outer reduced threaded end, and the outer disk carried by said axle of a lock washer positioned over the outer end of said squared axle against said outer disk, a non circular sleeve connected to said reduced threaded axle end, a non circular stud connected to the outer end of said non circular sleeve, a spacing member positioned over said non circular sleeve and non circular stud, one end of said spacing member being provided with serrations adapted to engage said lock washer, and extra disk positioned over said non circular stud, and means for retaining said disk in position on the non circular stud.

In testimony whereof I have signed my name to this specification in the presence of two subscribing witnesses.

ANTHONY SCHULTE.

Witnesses:
P. A. SULLIVAN,
PAUL A. NORCKER.

Copies of this patent may be obtained for five cents each, by addressing the "Commissioner of Patents, Washington, D. C."